US011675758B2

(12) United States Patent
Chennen et al.

(10) Patent No.: US 11,675,758 B2
(45) Date of Patent: *Jun. 13, 2023

(54) EARLY DETECTION AND WARNING FOR SYSTEM BOTTLENECKS IN AN ON-DEMAND ENVIRONMENT

(71) Applicant: Salesforce, Inc., San Francisco, CA (US)

(72) Inventors: Pratheesh Ezhapilly Chennen, Union City, CA (US); Vishwajit Kumar, Fremont, CA (US); Siddharth Samant, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,009

(22) Filed: Jun. 21, 2021

(65) Prior Publication Data

US 2021/0311938 A1 Oct. 7, 2021

Related U.S. Application Data

(63) Continuation of application No. 16/176,992, filed on Oct. 31, 2018, now Pat. No. 11,061,894.

(51) Int. Cl.
| | |
|---|---|
| *G06F 17/30* | (2006.01) |
| *G06F 16/21* | (2019.01) |
| *G06F 11/34* | (2006.01) |
| *G06F 11/30* | (2006.01) |
| *G06F 11/32* | (2006.01) |
| *G06F 16/2453* | (2019.01) |

(Continued)

(52) U.S. Cl.
CPC ........ *G06F 16/217* (2019.01); *G06F 11/3055* (2013.01); *G06F 11/327* (2013.01); *G06F 11/3423* (2013.01); *G06F 16/2453* (2019.01); *G06F 16/252* (2019.01); *G06F 18/24* (2023.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 2007/0078988 A1* | 4/2007 | Miloushev | G06F 9/5027 709/227 |
| 2007/0220513 A1* | 9/2007 | Hwang | G06F 9/524 718/1 |

(Continued)

*Primary Examiner* — Hung D Le
(74) *Attorney, Agent, or Firm* — Kwan & Olynick LLP

(57) ABSTRACT

In accordance with embodiments, there are provided mechanisms and methods for facilitating early detection and warning for system bottlenecks in an on-demand services environment according to one embodiment. In one embodiment and by way of example, a method includes detecting waits during processing of a query within a processing pipeline, wherein the waits include one or more of application-specific waits and database-specific waits; diagnosing the waits to identify a wait that has turned into a bottleneck; classifying one or more types of issues causing the wait to turn into the bottleneck; generating an alert having associated information detailing the issues based on the one or more types and a location of the wait within the processing pipeline; and transmitting the alert to facilitate correction activities.

21 Claims, 9 Drawing Sheets

(51) Int. Cl.
   *G06F 16/25*   (2019.01)
   *G06F 18/24*   (2023.01)

(56) References Cited

U.S. PATENT DOCUMENTS

| | | | |
|---|---|---|---|
| 2010/0125565 A1* | 5/2010 | Burger | G06F 16/2453 |
| | | | 707/E17.131 |
| 2010/0268816 A1* | 10/2010 | Tarui | G06F 11/3409 |
| | | | 718/1 |
| 2011/0219208 A1* | 9/2011 | Asaad | G06F 9/06 |
| | | | 712/12 |
| 2012/0131309 A1* | 5/2012 | Johnson | G06F 8/40 |
| | | | 712/E9.004 |
| 2015/0088968 A1* | 3/2015 | Wei | G06F 9/54 |
| | | | 709/203 |
| 2016/0182328 A1* | 6/2016 | Bhasin | H04L 43/04 |
| | | | 709/224 |
| 2017/0147407 A1* | 5/2017 | Nasser | G06F 11/3452 |
| 2018/0123918 A1* | 5/2018 | Steinhauser | H04L 43/0858 |
| 2018/0314802 A1* | 11/2018 | Dreyer | G16H 40/63 |
| 2019/0095470 A1* | 3/2019 | Dundjerski | G06F 16/217 |
| 2019/0108004 A1* | 4/2019 | Kavanagh | G06F 11/3466 |

* cited by examiner

EARLY DETECTION AND WARNING FOR SYSTEM BOTTLENECKS IN AN ON-DEMAND ENVIRONMENT

CLAIM OF PRIORITY

The subject application is a continuation of U.S. patent application Ser. No. 16/176,992, entitled "EARLY DETECTION AND WARNING FOR SYSTEM BOTTLENECKS IN AN ON-DEMAND ENVIRONMENT," filed Oct. 31, 2018, the contents of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate efficient data processing in an on-demand services environment.

BACKGROUND

Conventional techniques are late in detection of bottlenecks and consequently, any performance issues are not detected until their impact is widespread and/or prolonged.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
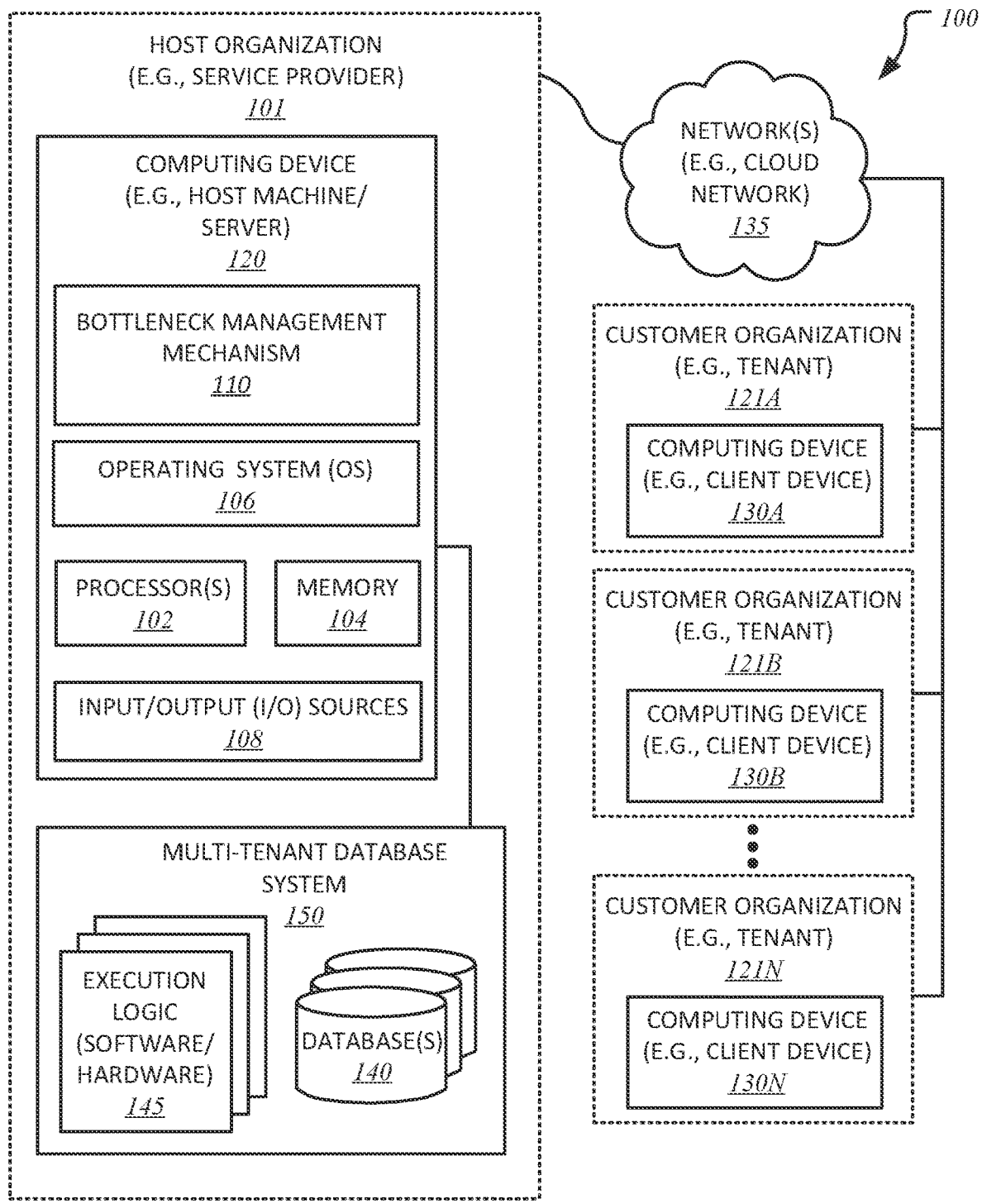
FIG. 1 illustrates a system having a computing device employing a bottleneck management mechanism according to one embodiment.

In accordance with embodiments, there are provided mechanisms and methods for facilitating early detection and warning for system bottlenecks in an on-demand services environment according to one embodiment. In one embodiment and by way of example, a method includes detecting waits during processing of a query within a processing pipeline, wherein the waits include one or more of application-specific waits and database-specific waits; diagnosing the waits to identify a wait that has turned into a bottleneck; classifying one or more types of issues causing the wait to turn into the bottleneck; generating an alert having associated information detailing the issues based on the one or more types and a location of the wait within the processing pipeline; and transmitting the alert to facilitate correction activities While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for monitoring and detection of performance issues within a processing structure at the time when a processing wait turns into a bottleneck. In one embodiment, such performance issues are then diagnosed, and the pertinent data is correlated, and any of the performing issues that are database-specific are isolated for further processing. In one embodiment, alerts having information detailing the performance issues are generated and transmitted so the performance issues may be addressed and fixed before they can turn into widespread and prolonged problems.

It is contemplated and to be noted that embodiments are not limited to certain types of queries or query languages, such as Salesforce Object Query Language (SOQL), Salesforce Object Search Language (SOSL), Sequential Query Language (SQL), etc. However, for the sake of brevity clarity, SQL may be used as an example throughout this document, but that embodiments are not limited as such.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a bottleneck management mechanism 110 according to one embodiment. In one embodiment, bottleneck management mechanism 110 provides for regulation-compliant (e.g., GDPR-compliant) processing of queries and data associated with such queries such that user-supplied (including user-specific) data is protected per the pertinent regulations.

As illustrated, in one embodiment, computing device 120, being part of host organization 101 (e.g., service provider, such as Salesforce.com®), represents or includes a server computer acting as a host machine for bottleneck management mechanism 110 for facilitating smart deployment of metadata packages in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of bottleneck management mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
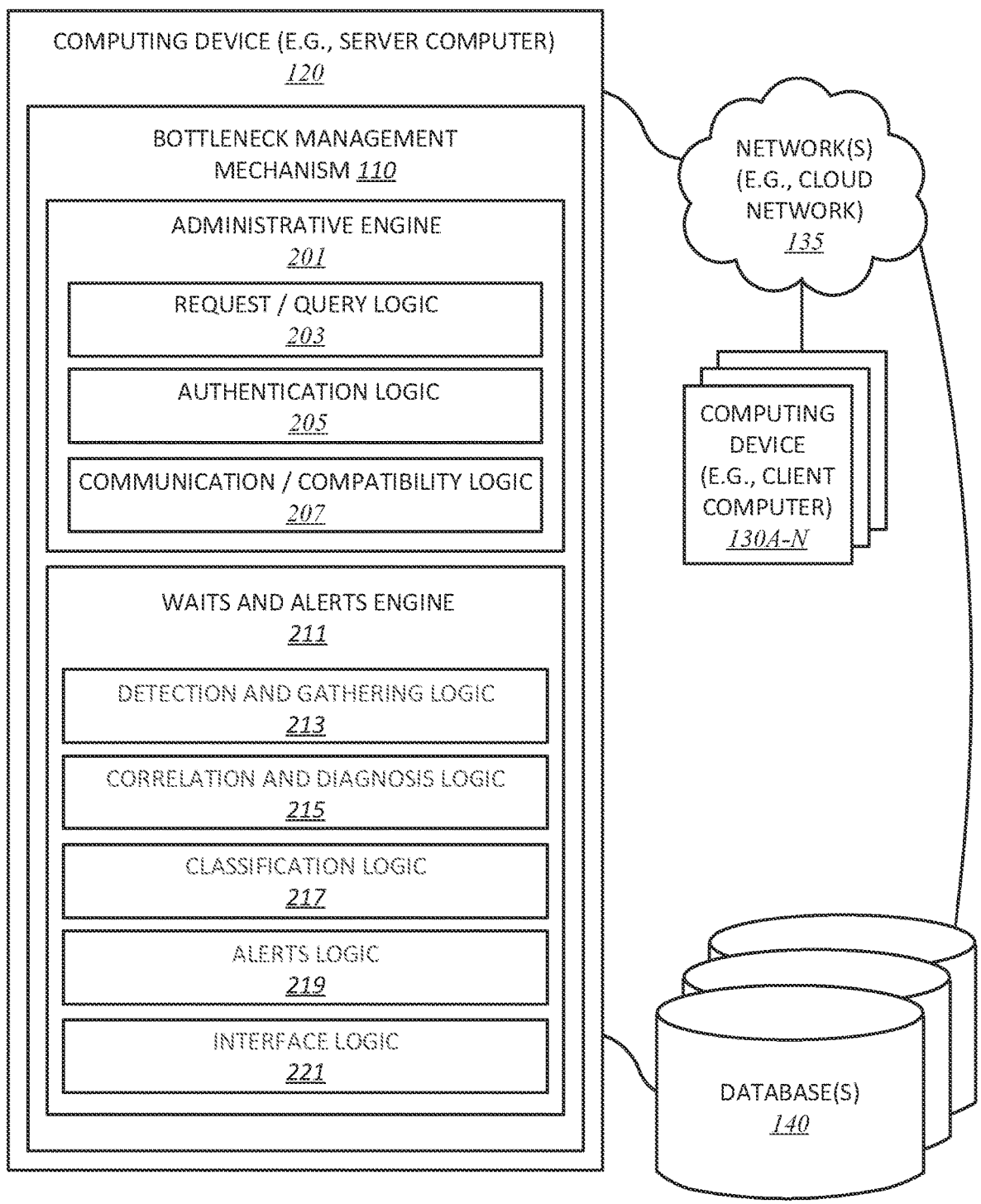
FIG. 2 illustrates a bottleneck management mechanism according to one embodiment.

FIG. 2 illustrates bottleneck management mechanism 110 of FIG. 1 according to one embodiment. In one embodiment, bottleneck management mechanism 110 provides for regulation-compliant processing and storing of queries and data, respectively, where bottleneck management mechanism 110 includes any number and type of components, such as administration engine 201 having (without limitation):

request/query logic 203; authentication logic 205; and communication/compatibility logic 207. Similarly, bottleneck management mechanism 110 may further include waits and alerts engine 211 including (without limitations): detection and gathering logic 213; correlation and diagnosis logic 215; classification logic 217; alerts logic 219; and interface logic 221.

In one embodiment, computing device 120 may serve as a service provider core (e.g., Salesforce.com® core) for hosting and maintaining bottleneck management mechanism 110 and be in communication with one or more database(s) 140, one or more client computer(s) 130A-N, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, server computing device serving as bottleneck management server computing device ("bottleneck management device") 120 is shown in communication with client computing devices ("client devices") 130A-N over one or more network(s) 135 (e.g., cloud network, Internet, etc.). In one embodiment, client devices, such as client device 130A, may be provided a user interface as facilitated by interface logic 221, where the user interface may serve as a layer above and associated with API(s) provided by a service provider (e.g., Salesforce.com®).

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "query", "data", "wait", "alert", "database", "application", "detecting", "gathering", "diagnosing", "classifying", "transmitting", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client device(s) 130A-N, code execution requests, and so forth.

In one embodiment, computing device 120 may implement request/query logic 203 to serve as a request/query interface via a web server or as a stand-alone interface to receive requests packets or other requests from the client device(s) 130A-N. The request interface may further support the return of response packets or other replies and responses in an outgoing direction from computing device 120 to one or more client device(s) 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device(s) 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices) 130A-N, over one or more communication mediums, such as network(s) 140.

As previously described, in one embodiment, any application performance issues caused by database bottlenecks are detected as early as possible, such as at a stage where a wait may turn into a bottleneck, to minimize customer impact and ensure a smooth and seamless customer experience for a service provider's infrastructure, as facilitated by bottleneck management mechanism 110. It is contemplated that customers refer to tenants, while a service provider includes a company like Salesforce.com®.

Conventionally, application performance issues are detected too late until the impact is already widespread or prolonged. This is often because the conventional techniques are limited to a one-sided view of either the application or database performance metrics, which leaves it virtually impossible to detect application performance issues caused by database(s) 140 in an early stage. Further, for example, database(s) 140 can have several waits at the same time, where a wait (also referred to as "wait state", "wait stage", or "wait event") refers to a stage where the operation (e.g., query, job request, etc.) is in an idle stage, such as waiting for resources to become available, resource dependency to end, events to occur, instructions to be executed, etc., but these waits by themselves may not be reflective of application performance degradation.

Further, conventional techniques have historically relied upon thresholds of average wait time to determine if a particular wait on database(s) 140 is impacting the health of a system. This is problematic and severely limited in that many of the waits are not part of application transactions and therefore can be misleading. Further, a genuine issue can be missed if the duration of a wait is spread on longer interval of time.

Embodiments provide for a novel technique to initiate the wait detection process from the source or the impact relating to an application layer and then correlate the application metrics with the database metrics associated with a wait event, as facilitated by waits and alerts engine 211. In one embodiment, as facilitated by waits and alerts engine 211, this correlated view reveals the impact of a particular database wait on the application layer even if the application and/or the database waits are not yet widespread or prolonged.

Embodiments provides for an early warning system based on a multi-layered metrics correlation framework, as facilitated by bottleneck management mechanism 110, for detection of early signs of database performance issues correlating with application waits, such as connection pool waits, to allow for generating and transmitting high-quality early signals associated with potential database incidents. Further, automatic analysis of such high-quality signals is performed with key database wait event metrics to find the exact locations and types of database bottlenecks for preventive actions. This novel technique allows for proactive detection of tenant queries potentially causing database incidents as soon as possible and taking proactive actions, within a reasonable timeframe, to mitigate or resolve underlying database issues before they can build up to a widespread performance issue and cause much bigger impact to tenants.

Further, this novel technique performs multi-layer and multi-level correlations of customer impact metrics, such as application waits, with key database performance metrics to find a root cause of any database performance issues. Further, alerts detailing pertinent information about bottlenecks are generated and transmitted to database administrators, so any preventive actions can be taken to mitigate or resolve the outstanding issues. As described earlier, correlation between application and database metrics is detected by, for example, correlating the application waits on a database node with an active session spike on that node during the same time period. Further, correlation is performed between active sessions and database wait events with highest number of sessions waiting to know which particular database event is causing the customer impact. If there are no correlations between application waits and the active session spike and wait events spike on the database, then the impact was not regarded as being caused by database issues and not actions, such as generation and transmission of an alerts, are triggered.

Embodiments further provide for extension of correction to other types of tenant impact and application waits, such as concurrent apex limit errors with database performance issues. In some embodiments, certain application waits occur due to database performance issues, while, in some other embodiments, these waits are caused by application server performance and other such issues.

In conventional techniques, impacts caused by database performance issues are detected only after they becomes widespread and prolonged database issues. Further, the current isolated view based on monitoring and alerting of application and database performance metrics allow for very late detection of impacts, such as when they have already become widespread and/or prolonged issues. For example, conventionally, notifications are not only too late in the process, but also difficult to conclusively determine whether spike in these database waits is actually causing an impact.

Further, application waits, such as connection pool waits, etc., are rather sensitive to database issues and thus even a small spike in database events can cause these waits. Such application waits often represent the first and/or early signs of impact that is typically not visible in the alerts and monitoring based on high threshold application and database performance metrics. Conventionally, such waits can impact the tenants as well as database performance for a service provider and can go for a long time without being caught in any of the alerts or monitoring until a user complain about these issues or they become high impact database level issue impacting multiple tenants. Under conventional techniques, there is no proactive way to detect these customer impacts, correlate them with database issues, or take corrective actions in time.

Embodiments provide for a novel early detection and warning technique with a correlated complete picture view of application and database performance metrics that can fill all the conventional gaps, while offering automated scanning of application waits, such as connection pool waits, etc., to proactively detect the impacts shortly after the very first occurrence of these waits, such as to find the early signs of bottlenecks and correlate them with key database performance metrics to confirm that a bottleneck or its impact was indeed database-specific. Once confirmed, an alert detailing this information is generated and transmitted, such as via email, to facilitate preventive actions to mitigate or resolve the underlying database issues.

Stated differently, this novel technique provides for detection of a potential database performance issue, as early as possible, to save the system and the tenants from a much bigger impact down the line, while minimizing the impact caused by repeat database performance issues that are typically not detected by the conventional monitoring and alerts techniques.

In one embodiment, detection and gathering logic 213 of waits and alerts engine 211 is triggered to continuously scan and monitor application performance metrics, such as application-specific waits, where these are the ones that represent the health of any pertinent applications. For example, detection and gathering logic 213 continues works to monitor queries (e.g., tasks, operations, requests, jobs, etc.) associated with an application and follow each query from the time it is placed, throughout its processing and execution within a query or job processing pipeline, and the output that is generated and offered back to the user to detect any waits along the way, as shown with respect to FIG. 3A. It is contemplated that some level of wait is common and regarded as acceptable as a query gets processed, but the wait can potentially cause performance issues if it turns into a bottleneck.

In one embodiment, detection and gathering logic 213 is further to capture and gather any information, such as performance metrics, associated with applications and database(s) 140, to see whether at any spot, the performance is lower than a threshold or expectation. For example, performance metrics can include application and/or database waits or other factors relating to such waits and are indicative of the overall health of the system. Once this data (e.g., performance metrics) is gathered by detection and gathering logic 213, the data is then communicated on to correlation and diagnosis logic 215 for further processing.

Upon receiving the data, correlation and diagnosis logic 215 is then triggered to perform a multi-layered correlation of application performance metrics and database performance metrics, such as application waits, database waits, etc., to then diagnose the data to determine whether any correlation is established between the two sets of data, such as application waits and database waits. In one embodiment, as facilitated by correlation and diagnosis logic 215, if the correlation is not established, then the process is terminated and moves on to the next set of data; if, however, in another embodiment, if the correction is established, then the application performance degradation is determined to be caused by a database bottleneck.

Some of the most common types of application waits include pools of waits, such as connection pool waits, having a pool of pre-defined connections established with database(s) 140 and is limited in number. Further, at any given point of time for a customer query to process, a connection from a pool is determined and the connection is then used to return back to the pool, as facilitated by correlation and diagnosis logic 215. It is contemplated that any slowness or performance bottleneck at any layer (e.g., database layer) may slow the transactions rate and reduce the number of connections returned to the pool, where lack of connections in the pool may cause any customer queries to wait and even ultimate fail.

For example, with regard to connection pool waits, performance metrics showing requests waiting for connection from the application tier at a particular interval, where application metrics are detected and gathered and an application metric representing active sessions is selected for consideration. Similarly, for example, database metrics as detected by detection and gathering logic 213 and as diagnosed and correlated with any application metrics as facilitated by correlation and diagnosis logic 215, a database metric representing active sessions, such as an average of the active sessions, may be considered for the same interval on database(s) 140. Now, if both metrics are shown as correlated, or indicating a correlated change, as facilitated by correlation and diagnosis logic 215, then such metric is determined by correlation and diagnosis logic 215 as representing a bottleneck in database(s) 140. Stated differently, this correlation between the application metric and the database metric during the same interval in processing of a query request or response indicates that a wait in the database processing pipeline has just turned into a bottleneck and thus this bottleneck is regarded as database-specific.

In one embodiment, continuing with the above example, if the application and database metrics were not correlated, then such a bottleneck would not be regarded as database-specific or in other words, this bottleneck may have been caused by one or more applications running supported by one or more application servers. For example, an application-specific bottleneck may be caused by multiple applications or, in some cases, multiple portions of the same applications, completing for the same resources, or a portion of the application is paused until another portion of the same or another application is first processed. In one embodiment, if a bottleneck is regarded as application-specific by correlation and diagnosis logic 215, then alert logic 219 is not triggered and the bottleneck is disregarded.

If, however, a bottleneck is regarded as database-specific, then correlation and diagnosis logic 215 forwards this finding and another pertinent data on to classification logic 217. In one embodiment, classification logic 217 may then obtain the necessary data associated with the bottleneck, such as from one or more database(s) 140, to develop a file on the bottleneck. For example, this file may include deeper classification of the bottleneck, such as listing any specific reasons, processes, components, etc., involved in or causing the bottleneck or the spike in the average active session (AAS). For example, some of the use case scenarios may include: 1) connection pool wait connection with database performance bottlenecks (or waits); 2) concurrent apex error with database performance bottlenecks (or waits); and 3) long running requests timeouts with database performance bottlenecks (or waits).

In one embodiment, classification logic 217 collects and puts together background information about the bottleneck, such as whether there are any resource contentions in database(s) 140 causing the bottleneck, level of correlation, lack of certain resources, type of database(s) 140, content restraint, SQL problems, etc., to classify the reasons and issues leading to the bottleneck. This classification information is then forward on to alerts logic 219 for consideration and further processing.

For example, alerts logic 219 considers the classification information to generate an alert identifying all the pertinent information about the bottleneck. Further, in one embodiment, alerts logic 219 transmits the alert along with the pertinent information to a computing device where it can be accessed by a database administrator, such as transmitted to one or more of client device(s) 130A-N to be accessed through user interface(s) 251 as facilitated by interface logic 221. This alert not only warns the database administrator of the bottleneck but also provides the necessary information so that the database administrator knows the issues concerning the bottleneck. This is to allow the database administrator to take the necessary steps to consider and fix the issues so that not only the bottleneck can be fixed but also any similar bottlenecks could be avoided in future.

As mentioned previously, it is contemplated that queries may include any number and type of requests seeking responses for processing jobs, running reports, seeking data, etc. These queries are typically placed by users on behalf of tenants, using client device(s) 130A-C. It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from bottleneck management mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

Figure 3A:
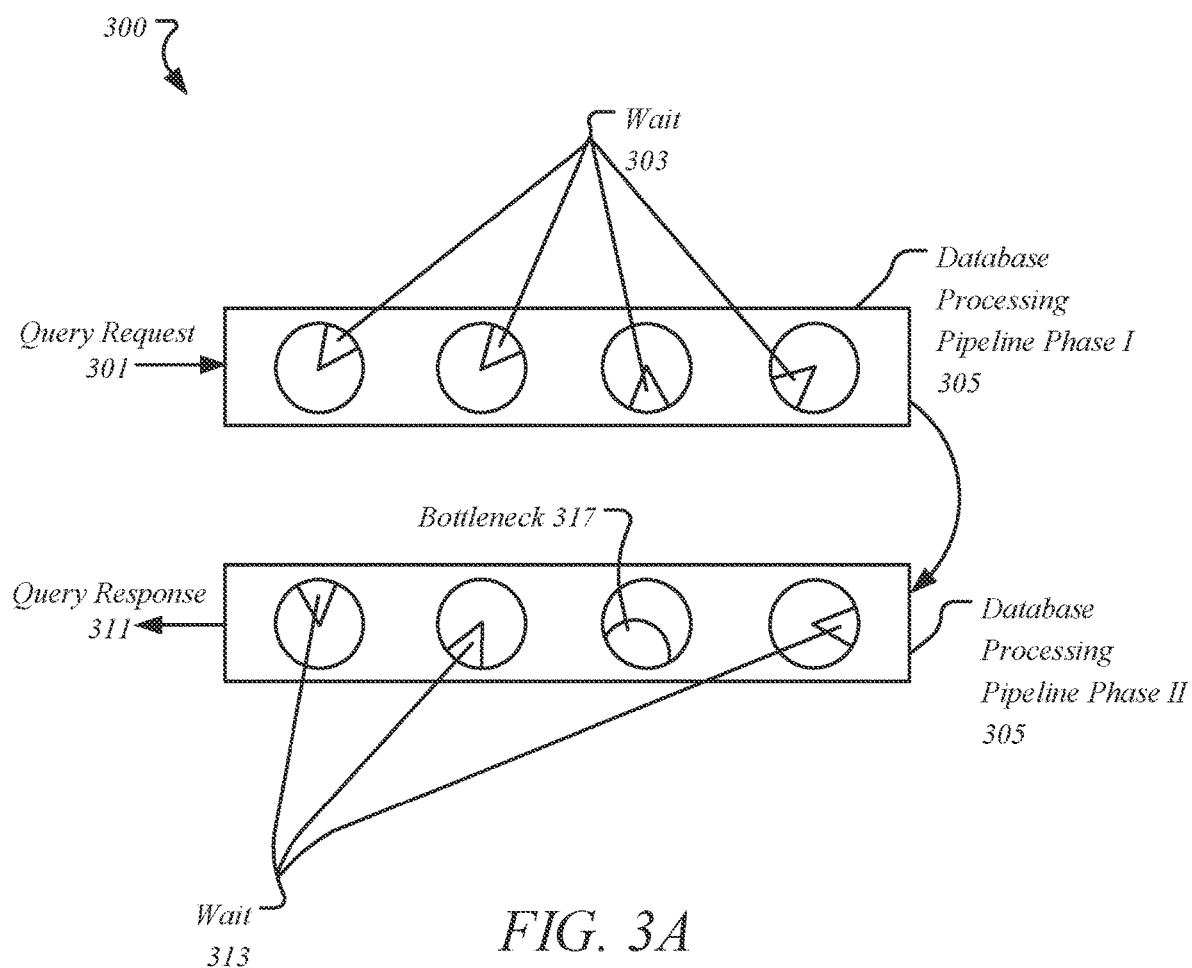
FIG. 3A illustrates a transaction sequence for processing of queries through waits and bottlenecks according to one embodiment.

FIG. 3A illustrates a transaction sequence 300 according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by one or more components of bottleneck management mechanism 110 of FIG. 1. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

As illustrated, once placed by a user, query request 301 is put through database processing pipeline phase I ("phase I") 305 and as expected, query request 301 passed through phase I 305 as it is processed. While query request 301 is processed through phase I 305, as contemplated, at numerous occasions, waits 303 are experiences, but as shown, these waits 303 remain as waits and do not become big enough to be regarded as bottlenecks.

As further illustrated, any relevant data that is accessed or captured in response to query request 301 is processed through database processing pipeline phase II ("phase II") 315 to generate query response 311 which is offered to the user in response to query request 301. In this case, as illustrated, any processing for preparation of query response 311 through phase II 315 encounters additional waits 313 along with bottleneck 317. As discussed, bottleneck 317 refers to a wait that got much bigger to be regarded an expected nuisance and is now a potential issue in processing of query response 311.

Figure 3B:
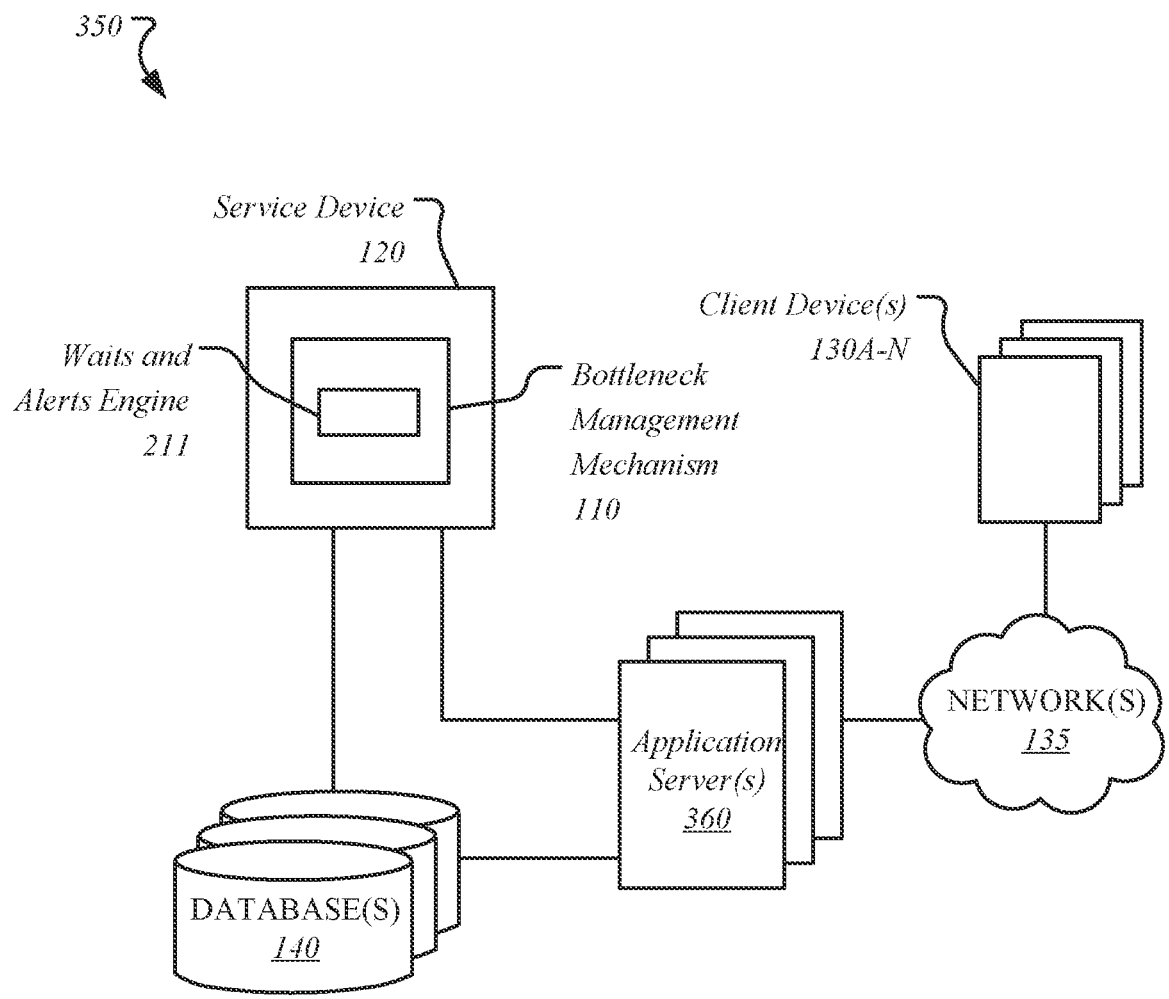
FIG. 3B illustrates an architectural setup for early detection and warning of bottlenecks according to one embodiment.

FIG. 3B illustrates an architecture setup 350 according to one embodiment. Further, for brevity, clarity, and ease of understanding, many of the components and processes described with respect to FIGS. 1-3A may not be repeated or discussed hereafter. It is contemplated that embodiments are not limited to any architectural setups, such as architectural setup 350.

In the illustrated embodiment, architectural setup 350 is shown as including server device 120 hosting bottleneck management mechanism 110 including waits and alerts engine 211, where server device 120 is coupled to database(s) 140 and application server(s) 360. As further illustrated, application server(s) 360 are in communication with client device(s) 130A-N over network(s) 135.

Figure 4A:
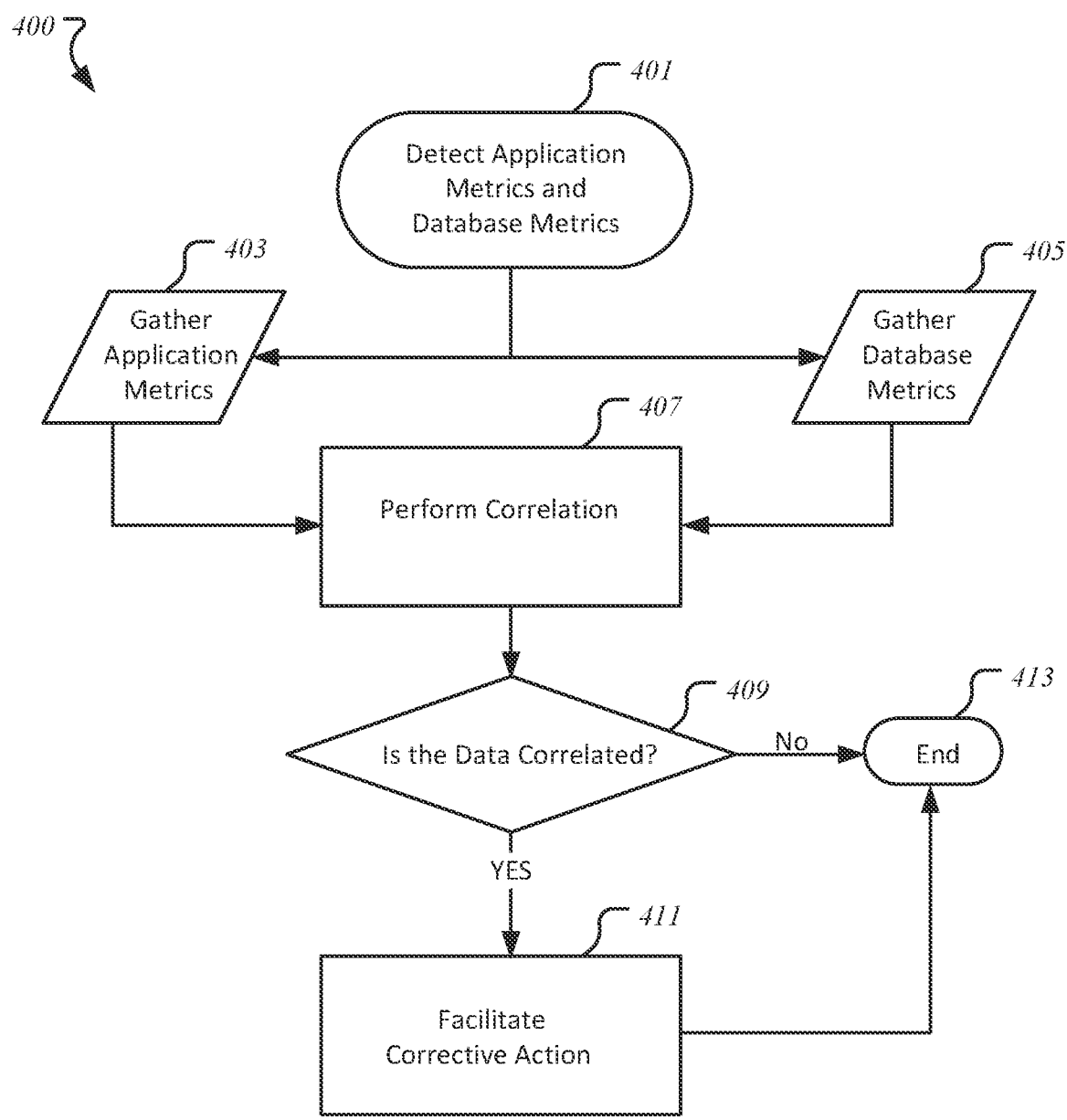
FIG. 4A illustrates a method for early detection and warning of bottlenecks according to one embodiment.

FIG. 4A illustrates a method 400 according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of bottleneck management mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3B may not be repeated or discussed hereafter.

Method 400 begins with detection of application metrics and database metrics at block 401, where the application and database metrics relate to waits that could be application-specific or database-specific. At block 403, the detected application metrics are gathered, while at block 405, the detected database metrics are gathered. At block 407, in one embodiment, correlation of the application and database metrics is performed. At block 409, a determination is made as to whether is any correlation between any of the application metrics and the database metrics. If there is no correlation, method 400 ends at block 413. If, however, there is some correlation between an application metric and a database metric, corrective action is facilitated at block 411. In one embodiment, this correlation indicates that a bottleneck is database-specific and in that case, any information relating to issues associated with the bottleneck is collected and then an alert detailing this information is generated and transmitted to a computing device accessible to a database administrator so that the bottleneck may be corrected.

Figure 4B:
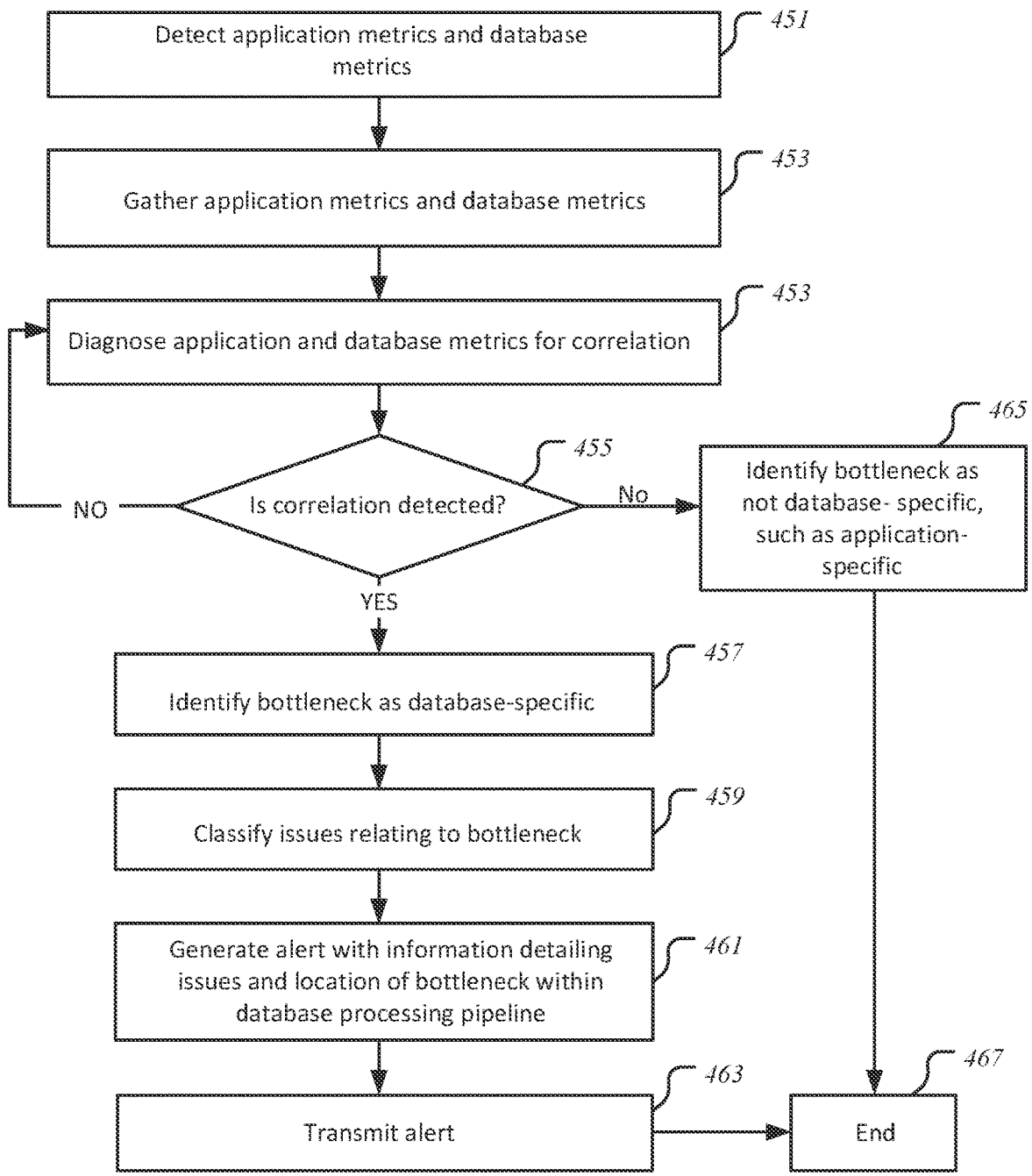
FIG. 4B illustrates a method for early detection and warning of bottlenecks according to one embodiment.

FIG. 4B illustrates a method 450 according to one embodiment. Method 400 may be performed by processing logic that may comprise hardware (e.g., circuitry, dedicated logic, programmable logic, etc.), software (such as instructions run on a processing device), or a combination thereof. In one embodiment, method 450 may be performed or facilitated by one or more components of bottleneck management mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4A may not be repeated or discussed hereafter.

Method 450 begins at block 451 with detecting of application metrics and database metrics associated with processing of requests and responses within various stages of a database processing pipeline in a multi-tenant database environment. At block 453, the detected application and database metrics are gathered for processing. At block 455, a determination is made as to whether any correlation between one or more application metrics and one or more database metrics is detected. If there is no correlation between the application and database metrics, then any bottlenecks are regarded as non-database-specific, such as application-specific at block 465, and method 450 ends at block 467.

If, however, there is some correlation between at least one application metric and at least one database metric, then at block 457, a bottleneck is identified and regarded as database-specific. At block 459, any issues relating to or causing the bottleneck are determined and classified. At block 461, an alert having associated information detailing the issues with the bottleneck and the current direction of the bottleneck within the database processing pipeline is generated. At block 463, the alert is transmitted to one or more computing devices so that one or more database administrators having access to the one or more computing devices can view the alert and the associated information and take any necessary and appropriate actions to fix bottleneck and ensure a smooth flow of query requests and responses.

Figure 5:
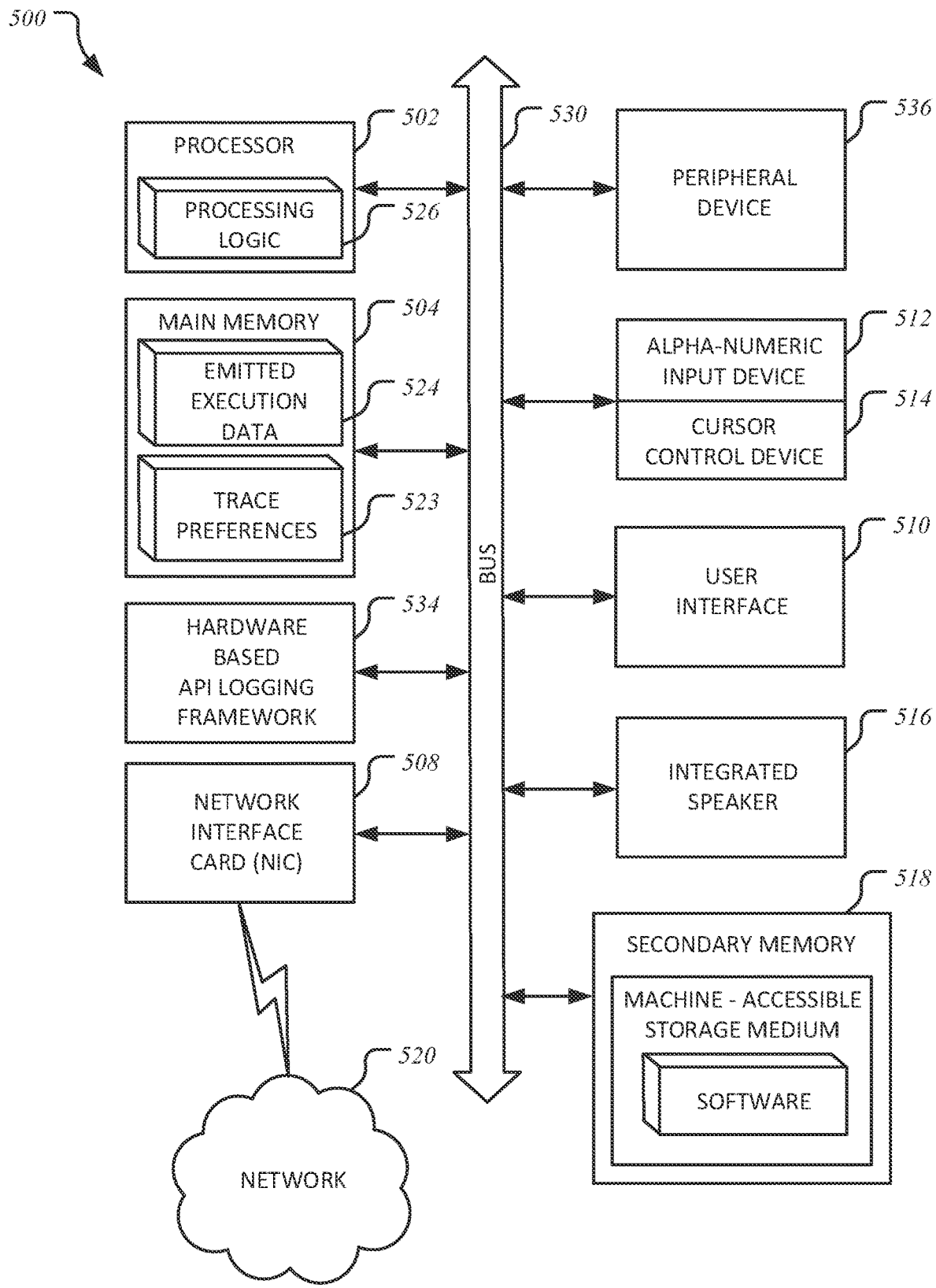
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of query mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of query mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
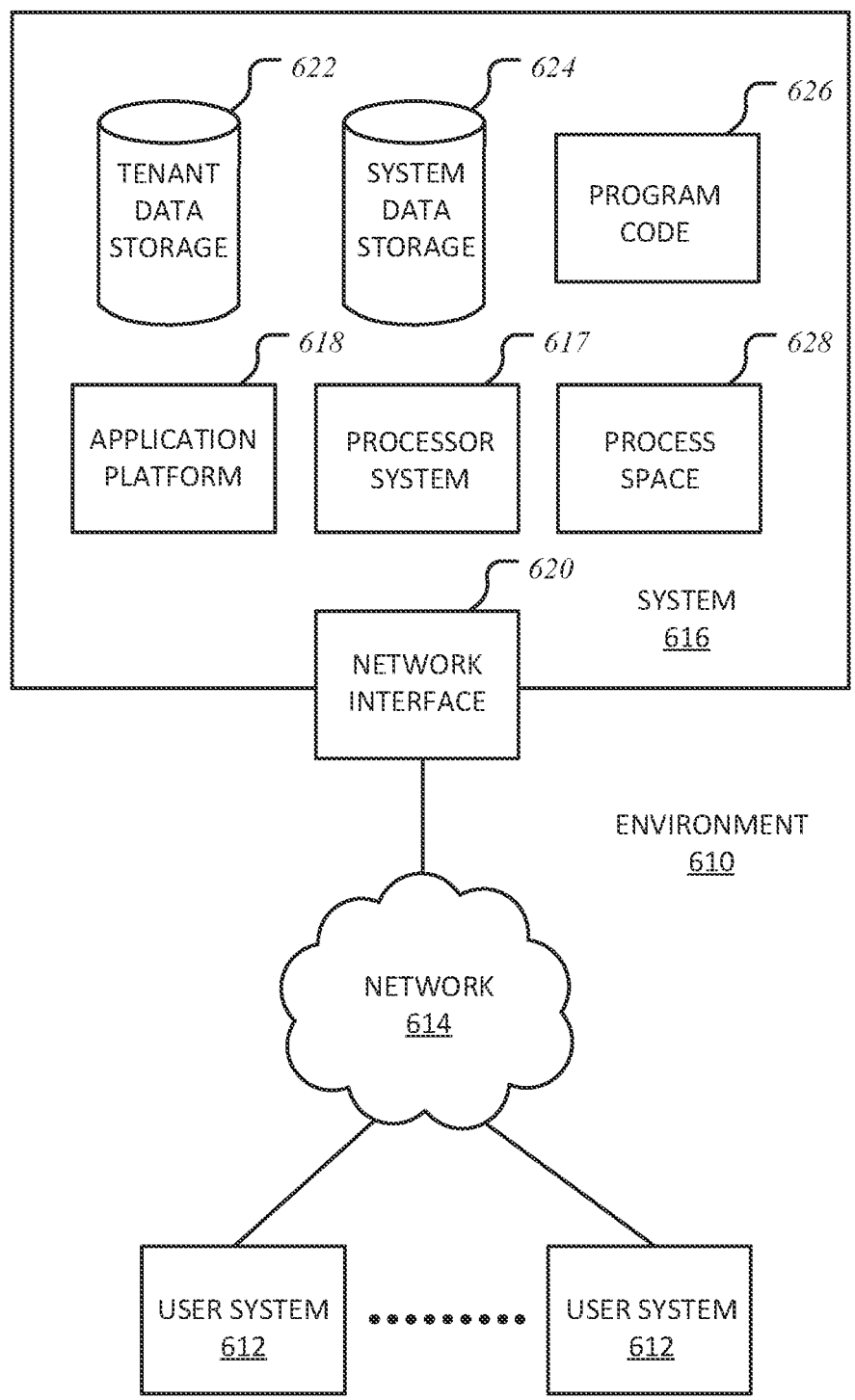
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 7:
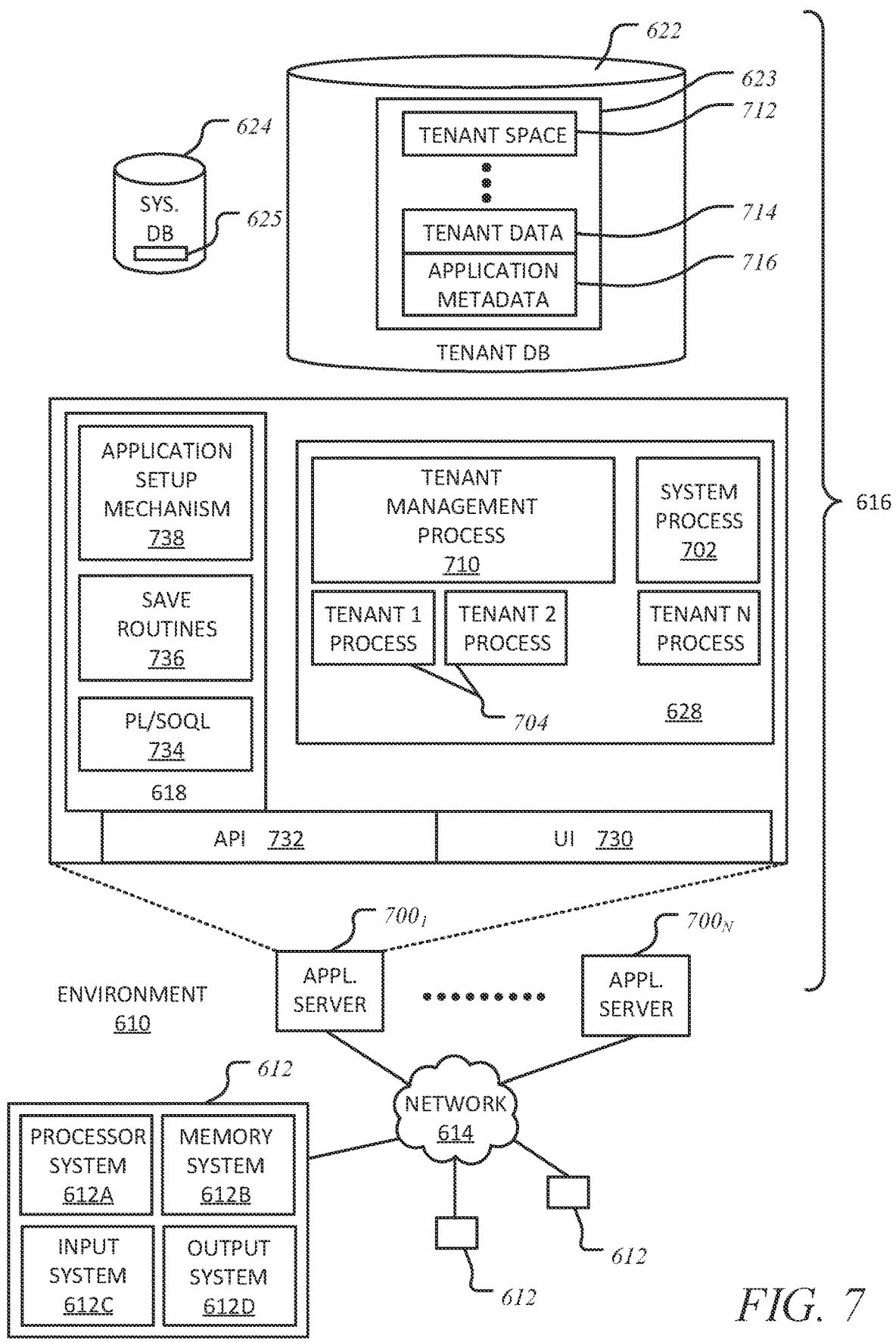
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
   detecting waits as application-specific waits or database-specific waits during processing of a query within a processing pipeline;
   obtaining one or more of 1) application metrics associated with the application-specific weights or 2) database metrics associated with the database-specific waits;
   identifying, based on the application metrics or the database metrics, a wait that has turned into a bottleneck;
   classifying one or more issues causing the wait to turn into the bottleneck;
   generating an alert regarding the bottleneck based on the one or more issues and a location of the wait within the processing pipeline, wherein the alert is associated with information detailing the one or more issues based on the wait being an application-specific wait or a database-specific wait; and
   transmitting the alert to facilitate correction activities based on the information.

2. The method of claim 1, further comprising gathering the application metrics relating to one or more applications associated with the application-specific waits, wherein the application metrics include processing data relating to the one or more applications associated with the application-specific waits.

3. The method of claim 1, further comprising gathering the database metrics relating to one or more databases associated with the database-specific waits, wherein the database metrics include processing data relating to one or more databases associated with the database-specific waits.

4. The method of claim 1, further comprising detecting correlation between the application metrics and the database metrics,
   wherein an application metric correlating with a database metric indicates the bottleneck is caused by the database-specific wait, and
   wherein an absence of the correlation between the application metrics and the database metrics indicates the bottleneck is caused by the application-specific wait.

5. The method of claim 1, wherein the one or more issues are classified, and the alert is generated and transmitted if the bottleneck is caused by the database-specific wait, and
   wherein the one or more issues are not classified, and the alert is not generated or transmitted if the bottleneck is caused by the application-specific wait.

6. The method of claim 5, wherein classifying of the one or more issues comprises obtaining background data relating to the bottleneck and one or more databases associated with the bottleneck, wherein the information associated with the alert further includes the background data, wherein the query includes one or more of a query request and a query response, wherein the query response is generated in response to the query request.

7. The method of claim 1, wherein the alert is transmitted to a computing device offering access to the alert via a user interface including one or more of a graphical user interface (GUI), a web browser, or an application-based interface, and an application programming interface (API).

8. A database system comprising:
   a server computer having one or more processors coupled to memory having thereon instructions, the one or more processors to execute the instructions to perform operations comprising:
   detecting waits as application-specific waits or database-specific waits during processing of a query within a processing pipeline;
   obtaining one or more of 1) application metrics associated with the application-specific weights or 2) database metrics associated with the database-specific waits;
   identifying, based on the application metrics or the database metrics, a wait that has turned into a bottleneck;
   classifying one or more issues causing the wait to turn into the bottleneck;
   generating an alert regarding the bottleneck based on the one or more issues and a location of the wait within the processing pipeline, wherein the alert is associated with information detailing the one or more issues based on the wait being an application-specific wait or a database-specific wait; and
   transmitting the alert to facilitate correction activities based on the information.

9. The database system of claim 8, wherein the operations further comprise gathering the application metrics relating to one or more applications associated with the application-specific waits, wherein the application metrics include processing data relating to the one or more applications associated with the application-specific waits.

10. The database system of claim 8, wherein the operations further comprise gathering the database metrics relating to one or more databases associated with the database-specific waits, wherein the database metrics include processing data relating to one or more databases associated with the database-specific waits.

11. The database system of claim 8, wherein the operations further comprise detecting correlation between the application metrics and the database metrics,
    wherein an application metric correlating with a database metric indicates the bottleneck is caused by the database-specific wait, and
    wherein an absence of the correlation between the application metrics and the database metrics indicates the bottleneck is caused by the application-specific wait.

12. The database system of claim 8, wherein the one or more issues are classified, and the alert is generated and transmitted if the bottleneck is caused by the database-specific wait, and
    wherein the one or more issues are not classified, and the alert is not generated or transmitted if the bottleneck is caused by the application-specific wait.

13. The database system of claim 12, wherein classifying of the one or more issues comprises obtaining background data relating to the bottleneck and one or more databases associated with the bottleneck, wherein the information associated with the alert further includes the background data, wherein the query includes one or more of a query request and a query response, wherein the query response is generated in response to the query request.

14. The database system of claim 8, wherein the alert is transmitted to a computing device offering access to the alert via a user interface including one or more of a graphical user interface (GUI), a web browser, or an application-based interface, and an application programming interface (API).

15. A computer-readable medium having stored thereon instructions which, when executed, cause a computing device to perform operations comprising:
- detecting waits as application-specific waits or database-specific waits during processing of a query within a processing pipeline;
- obtaining one or more of 1) application metrics associated with the application-specific weights or 2) database metrics associated with the database-specific waits;
- identifying, based on the application metrics or the database metrics, a wait that has turned into a bottleneck;
- classifying one or more issues causing the wait to turn into the bottleneck;
- generating an alert regarding the bottleneck based on the one or more issues and a location of the wait within the processing pipeline, wherein the alert is associated with information detailing the one or more issues based on the wait being an application-specific wait or a database-specific wait; and
- transmitting the alert to facilitate correction activities based on the information.

16. The computer-readable medium of claim 15, wherein the operations further comprise gathering the application metrics relating to one or more applications associated with the application-specific waits, wherein the application metrics include processing data relating to the one or more applications associated with the application-specific waits.

17. The computer-readable medium of claim 15, wherein the operations further comprise gathering the database metrics relating to one or more databases associated with the database-specific waits, wherein the database metrics include processing data relating to one or more databases associated with the database-specific waits.

18. The computer-readable medium of claim 15, wherein the operations further comprise detecting correlation between the application metrics and the database metrics,
- wherein an application metric correlating with a database metric indicates the bottleneck is caused by the database-specific wait, and
- wherein an absence of the correlation between the application metrics and the database metrics indicates the bottleneck is caused by the application-specific wait.

19. The computer-readable medium of claim 15, wherein the one or more issues are classified, and the alert is generated and transmitted if the bottleneck is caused by the database-specific wait, and
- wherein the one or more issues are not classified, and the alert is not generated or transmitted if the bottleneck is caused by the application-specific wait.

20. The computer-readable medium of claim 19, wherein classifying of the one or more issues comprises obtaining background data relating to the bottleneck and one or more databases associated with the bottleneck, wherein the information associated with the alert further includes the background data, wherein the query includes one or more of a query request and a query response, wherein the query response is generated in response to the query request.

21. The computer-readable medium of claim 15, wherein the alert is transmitted to a computing device offering access to the alert via a user interface including one or more of a graphical user interface (GUI), a web browser, or an application-based interface, and an application programming interface (API).

\* \* \* \* \*